United States Patent
Perahia

(10) Patent No.: US 6,903,893 B2
(45) Date of Patent: Jun. 7, 2005

(54) ENERGY STORAGE FOR USE IN EMERGENCY HEAD RETRACTION IN DISK DRIVES

(75) Inventor: Avraham Perahia, San Jose, CA (US)

(73) Assignee: Riospring, Inc., Milpitas, CA (US)

( * ) Notice: Subject to any disclaimer, the term of this patent is extended or adjusted under 35 U.S.C. 154(b) by 69 days.

(21) Appl. No.: 10/687,050

(22) Filed: Oct. 16, 2003

(65) Prior Publication Data

US 2004/0100721 A1 May 27, 2004

Related U.S. Application Data

(60) Provisional application No. 60/429,758, filed on Nov. 27, 2002.

(51) Int. Cl.[7] .............................................. G11B 21/02
(52) U.S. Cl. ........................................................ 360/75
(58) Field of Search ............................ 380/75, 78.04, 380/69; 318/563, 565, 478

(56) References Cited

U.S. PATENT DOCUMENTS

| | | | | |
|---|---|---|---|---|
| 4,786,995 A | * | 11/1988 | Stupeck et al. | 360/75 |
| 6,567,232 B1 | * | 5/2003 | Klaassen | 360/75 |
| 6,594,102 B1 | * | 7/2003 | Kanda et al. | 360/75 |

* cited by examiner

*Primary Examiner*—Andrew L. Sniezek
(74) *Attorney, Agent, or Firm*—Michael B. Einschlag

(57) ABSTRACT

One embodiment of the present invention is a power source for a disk drive to handle an Emergency Power Off event that includes: (a) a storage capacitor; (b) a voltage source that outputs a first voltage that is applied as input to the storage capacitor; (c) a tester, responsive to the first voltage and a reference voltage; and (d) an adjustable voltage source, responsive to the tester output, that outputs a second voltage that is applied as input to the storage capacitor.

10 Claims, 1 Drawing Sheet

ENERGY STORAGE FOR USE IN EMERGENCY HEAD RETRACTION IN DISK DRIVES

This application claims the benefit of U.S. Provisional Application No. 60/429,758, filed on Nov. 27, 2002, which is incorporated herein by reference.

TECHNICAL FIELD OF THE INVENTION

One or more embodiments of the present invention relate generally to method and apparatus for use in emergency head retraction in a disk drive.

BACKGROUND OF THE INVENTION

Small form factor hard disk drives are typically utilized in portable appliances such as, for example and without limitation, digital cameras that are typically subjected to shocks and vibration. As is well known, to enhance the durability of such hard disk drives, whenever the drive in not being used, the disk drive heads are typically parked on a ramp away from the disk surface.

Under a normal turn-off condition, before power to the disk drive is turned off, the disk drive undergoes a predetermined sequence of steps to safely park the disk drive heads on the ramp. However, in abnormal circumstances such as, for example and without limitation, when power to the disk drive is suddenly disconnected (sometimes this is referred to as an Emergency Power Off ("EPO") event), the predetermined sequence of steps to park the heads on the ramp cannot take place. As is well known, in such abnormal circumstances, an EPO procedure is invoked wherein the disk drive heads are unloaded using energy stored in the disk drive. To prevent disk drive failure, the stored energy must be sufficient to enable the disk drive heads to be totally withdrawn from the disk surface, and parked on the ramp. In accordance with prior art methods utilized on large form factor hard disk drives, upon the occurrence of an EPO event, the disk drive will park the disk drive heads in a safe place (for example, on a safe place on the disk itself), using kinetic energy stored in a spindle and sometimes supplemented with energy stored in capacitors. If the supplemental storage capacitance is large, this may require significant amounts of space inside the disk drive.

In the case of a small form factor disk drive, energy storage issues related to the above-described method of dealing with an EPO event are exacerbated for several reasons. First, a small form factor disk drive typically uses a small spindle having negligible kinetic energy. As a result, the energy required to deal with an EPO event must all, or at least in substantial part, come from energy stored in capacitors. Second, as was set forth above, for durability, the disk drive heads must be unloaded onto a ramp, and this requires more energy that landing on a safe place such as, for example and without limitation, a safe place on the disk. Third, space on the disk drive is greatly restricted. As a result, the size of capacitors that can be used is limited.

The issue related to capacitor size can be understood as follows. For a given capacitor body size, a product of capacitance C and operating voltage V is a fixed value K, where K=C*V. Thus, for a fixed body size, doubling the operating voltage of the capacitor will reduce the capacitance value by a factor of 2. However, the energy E stored in a capacitor is proportional to a product of capacitance and the square of the operating voltage, i.e., $E=k*C*V^2$ where k is a constant of proportionality. Hence, for a fixed body size, doubling the operating voltage of the capacitor, will increase the stored energy by a factor of 4 (due to the increase in operating voltage) and will reduce the stored energy by a factor of 2 (due to the smaller capacitance), resulting in a net doubling of the stored energy in the fixed body size. This has been used in the prior art to reduce the overall physical size of capacitors required to store the requisite amount of energy needed to deal with an EPO. In particular, such an elevated voltage source for this purpose is already available in a disk drive due to the need for such voltages to satisfy other disk drive functions. This elevated voltage may also be used to charge the storage capacitors utilized as a source of energy for dealing with an EPO event. However, to prevent damage to the storage capacitors, their safe operating voltages must exceed an absolute maximum expected voltage available from the source of elevated voltage described above.

As is known, nominal or minimum values of the elevated voltage will vary due to spread in circuit component characteristics, power supply variations, and other factors. These variations are problematic because they can reduce the elevated voltage by 20% or more below that of its maximum value. As a result, as was described above, this can result in a possibility of a 40% or more reduction in stored energy in the capacitors, and this may result in an inadequate amount of energy to deal with an EPO event.

In light of the above, there is a need to overcome one or more of the above-identified problems.

SUMMARY OF THE INVENTION

One or more embodiments of the present invention satisfy one or more of the above-identified needs in the art. In particular, one embodiment of the present invention is a power source for a disk drive to handle an Emergency Power Off event that comprises: (a) a storage capacitor; (b) a voltage source that outputs a first voltage that is applied as input to the storage capacitor; (c) a tester, responsive to the first voltage and a reference voltage; and (d) an adjustable voltage source, responsive to the tester output, that outputs a second voltage that is applied as input to the storage capacitor.

DETAILED DESCRIPTION

Figure 1:
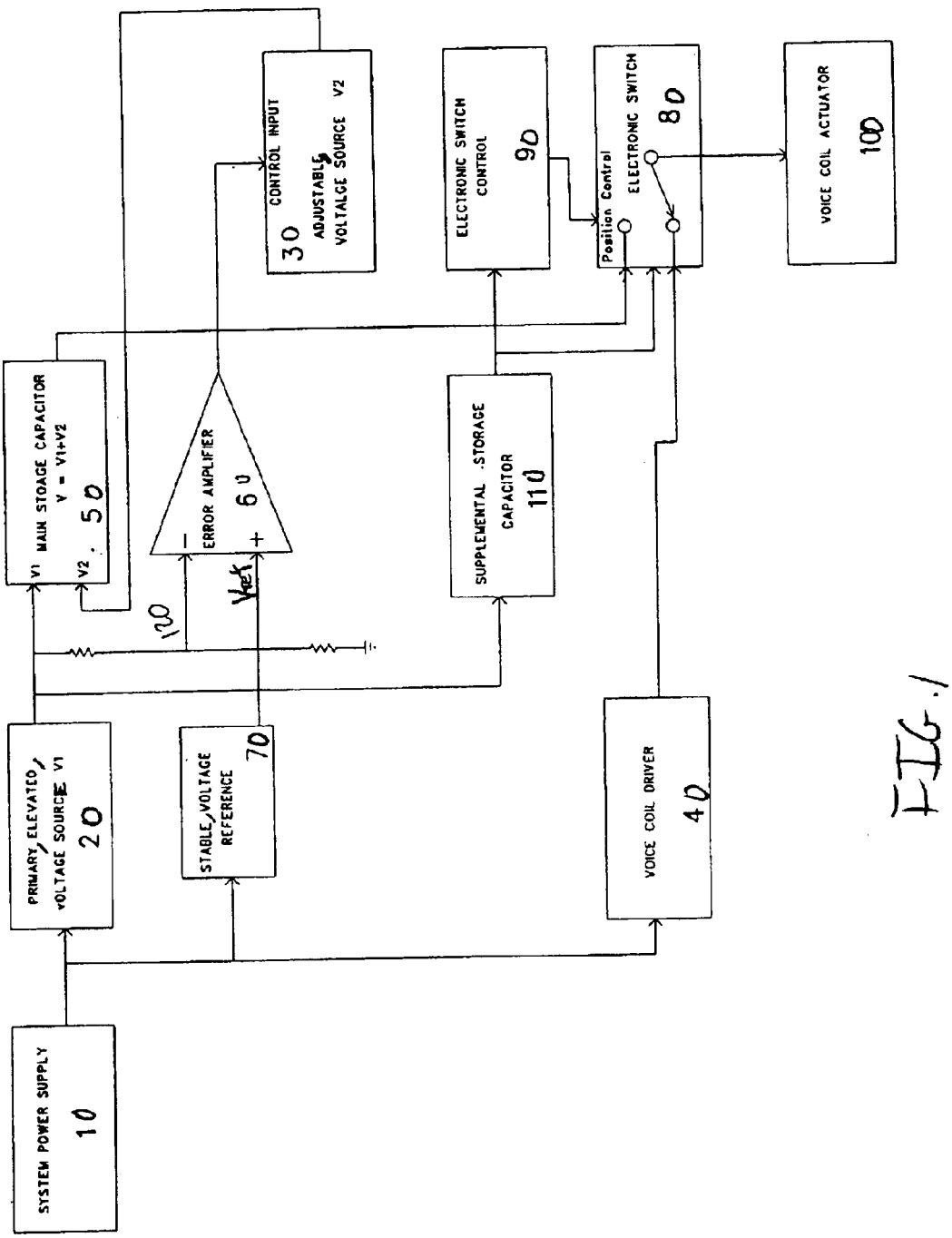
FIG. 1 shows a block diagram of power source circuitry of a disk drive that is fabricated in accordance with one or more embodiments of the present invention to provide sufficient stored energy to enable an Emergence Power Off ("EPO") procedure.

FIG. 1 shows a block diagram of power source circuitry 1000 for a disk drive that is fabricated in accordance with one or more embodiments of the present invention. System power supply 10 shown in FIG. 1 is located on a host for the disk drive. For example and without limitation, the host may be a portable appliance such as, for example and without limitation, a digital camera, and system power supply 10 may be a battery such as, for example and without limitation, a 3 volt battery. As shown in FIG. 1, power output from system power supply 10 is applied as input to: (a) primary, elevated, voltage source 20; (b) stable, voltage reference 70; and (c) voice coil driver 40. As is well known, primary, elevated, voltage source 20 may be fabricated in accordance with any one of a number of methods that are well known to those of ordinary skill in the art to provide a predetermined voltage output to enable various disk drive functions (such disk drive functions are not shown or further described to enable one to more easily understand the details of the various embodiments of the present invention). For example, primary, elevated, voltage source 20 may be, for example and without limitation, a voltage doubler or a voltage tripler of a type that is readily commercially available. As was discussed in the Background of the Invention, the predetermined voltage output from primary, elevated, voltage source 10 is sufficiently high that main storage capacitor 50 can store enough energy to enable Emergency Power Off ("EPO") procedures to be carried out (as will be described in detail below) whenever an EPO event occurs. Stable, voltage reference 70 may be fabricated in accordance with any one of a number of methods that are well known to those of ordinary skill in the art. For example and without limitation, stable, voltage reference 70 may be a bandgap voltage reference. Lastly, as is well known, voice coil driver 40 may be fabricated in accordance with any one of a number of methods that are well known to those of ordinary skill in the art to provide a drive voltage that is applied as input to voice coil actuator 100 to cause motion of disk drive heads in a conventional manner (as is well known, the voice coil actuator 100 is an electromechanical device that controls movement of the disk drive heads while on the disk or off the disk).

As shown in FIG. 1, output voltage V1 from primary, elevated, voltage source 20 is applied as input to main storage capacitor 50 and supplemental storage capacitor 110. In addition, as further shown in FIG. 1, output voltage V1 is applied as input to voltage divider 120, and an output from voltage divider 120 is applied as one input to error amplifier 60. As further shown in FIG. 1, output voltage $V_{ref}$ from stable, voltage reference 70 is applied as a second input to error amplifier 60. In response to the two inputs, error amplifier 60 is a tester that produces an output that is a measure of a difference between V1 and $V_{ref}$. Error amplifier 60 may be fabricated in accordance with any one of a number of methods that are well known to those of ordinary skill in the art using components that are readily and commercially available.

As further shown in FIG. 1, the measure of the difference between V1 and $V_{ref}$ output from error amplifier 60 is applied as input to a control input of adjustable, voltage source 30. In accordance with one or more embodiments of the present invention, a level of the signal applied as input to the control input, controls and sets a magnitude of voltage V2 output from adjustable, voltage source 30. As further shown in FIG. 1, output voltage V2 from adjustable, voltage source 30 is applied as input to main storage capacitor 50. Thus, in accordance with one or more embodiments of the present invention, the magnitude of the voltage applied as input to main storage capacitor 50 is V1+V2. Further, by applying the measure of the difference between V1 and $V_{ref}$ to the control input of adjustable, voltage source 30, the level of V2 is adjusted so that V1+V2 remains substantially constant. Thus, circuit 1000 is designed so that a change in V2 will negate a change in V1, and the gain is set to match the changes in the two magnitudes. As an example, (a) if V1 drops by an amount of k volts, then V2 will increase by the same amount of k volts; and (b) if V1 rises by an amount of k volts, then V2 will drop by the same amount of k volts. Thus, the total voltage applied to main storage capacitor 5, which is the sum of V1 and V2, will remain the same despite changes in V1. Adjustable, voltage source 30 may be fabricated in accordance with any one of a number of methods that are well known to those of ordinary skill in the art using components that are readily and commercially available. Advantageously, as a result of this, the energy stored in main storage capacitor 50 is maintained at a predetermined level suitable for use in an EPO procedure despite variation in V1. Further advantageously, and in accordance with one or more embodiments of the present invention, V1+V2 may be close to, but below, a maximum allowed operating voltage of main storage capacitor 50. For such embodiments, the energy stored in main storage capacitor 50 will be close to the maximum allowed.

As further shown in FIG. 1, output from voice coil driver 40 is applied as input to electronic voice coil switch 80, and output from electronic voice coil switch 80 is applied as input to voice coil actuator 100. In addition, power output from supplemental capacitor 110 is applied as input to electronic voice coil switch 80 and electronic switch control 90. Lastly power output from main storage capacitor 50 is applied as input to electronic voice coil switch 80. Electronic voice coil switch 80 and electronic switch control 90 may be fabricated in accordance with any one of a number of methods that are well known to those of ordinary skill in the art using components that are readily and commercially available.

The following describes the operation of power source circuitry 1000. During normal operating conditions, i.e., when there is no EPO event, primary, elevated, voltage source 20 charges main storage capacitor 50 and supplementary storage capacitor 110. Electronic switch control 90 commands electronic voice coil switch 80 to connect voice coil driver 40 to voice coil actuator 100 as required in normal operating conditions.

A "watch dog" circuit (not shown) may monitor, for example and without limitation, voltage output from system power supply 10. Whenever the voltage drops below a predetermined level, the "watch dog" circuit generates a "voltage unsafe" signal, and the presence of such a "voltage unsafe" signal generates an EPO event. For example, in accordance with one or more embodiments of the present invention, the "voltage unsafe" signal may be applied as input to electronic switch control 90. The "watch dog" circuit may be fabricated in accordance with any one of a number of methods that are well known to those of ordinary skill in the art using components that are readily and commercially available. In response to the "voltage unsafe" signal, electronic switch control 90 commands electronic voice coil switch 80 to connect voice coil actuator 100 to main storage capacitor 50 (in accordance with one or more embodiments of the present invention, electronic switch control 90 connects voice coil driver 40 to voice coil actuator 100 in the absence of the "voltage unsafe" signal). Further, whenever an EPO event occurs, the energy stored in supplementary storage capacitor 110 is sufficient to keep electronic switch control 90 and electronic voice coil switch 80 operating. Lastly, and advantageously in accordance with one or more embodiments of the present invention, the output from main storage capacitor 50 that is applied to voice coil actuator 100 (through electronic voice coil switch 80) forces current through voice coil actuator 100 in a direction that will drive the disk drive heads toward a parking place on a ramp, and in accordance with one or more embodiments of the present invention, the energy stored in main storage capacitor 50 is sufficient to drive the disk drive heads to a safe location on the ramp.

Although various embodiments that incorporate the teachings of the present invention have been shown and described in detail herein, those skilled in the art can readily devise many other varied embodiments that still incorporate these teachings.

What is claimed is:

1. A power source for a disk drive to handle an Emergency Power Off event that comprises:

a storage capacitor;

a voltage source that outputs a first voltage that is applied as input to the storage capacitor;

a tester, responsive to the first voltage and a reference voltage; and an adjustable voltage source, responsive to the tester output, that outputs a second voltage that is applied as input to the storage capacitor.

2. The power source of claim 1 wherein a sum of the first voltage and the second voltage is substantially constant.

3. The power source of claim 1 which further comprises a voltage reference that outputs the reference voltage.

4. The power source of claim 2 wherein the constant is close to, but below, a maximum allowed operating voltage of the storage capacitor.

5. The power source of claim 1 which further comprises a switching mechanism; wherein the switching mechanism connects a voice coil actuator of the disk drive to a voice coil driver of the disk drive or the storage capacitor.

6. The power source of claim 5 wherein the switching mechanism comprises a switch control and a switch, and wherein the switch control causes the switch to connect the voice coil actuator to the storage capacitor upon detection of an Emergency Power Off event.

7. The power source of claim 5 which further comprises a supplemental capacitor that supplies power to the switching mechanism upon occurrence of an Emergency Power Off event, wherein the first voltage is applied as input to the supplemental capacitor.

8. The power source of claim 1 wherein the tester output comprises a measure of a difference between the first voltage and the reference voltage.

9. A power source for a disk drive to handle an Emergency Power Off event that comprises:

a storage capacitor;

a voltage source that outputs a first voltage that is applied as input to the storage capacitor;

a voltage reference that outputs a reference voltage;

a tester, responsive to the first voltage and the reference voltage;

an adjustable voltage source, responsive to the tester output, that outputs a second voltage that is applied as input to the storage capacitor;

a switch that connects a voice coil actuator of the disk drive to a voice coil driver of the disk drive or the storage capacitor;

wherein the tester output is a measure of a difference between the first voltage and the reference voltage.

10. The power source of claim 9 wherein a sum of the first voltage and the second voltage is substantially constant.

* * * * *